United States Patent [19]

Altenburger et al.

[11] 3,732,377

[45] May 8, 1973

[54] OUTGOING TRUNK MARKER

[75] Inventors: Otto Altenburger; David W. Stoddard, both of Rochester, N.Y.

[73] Assignee: Stromberg-Carlson Corporation, Rochester, N.Y.

[22] Filed: Dec. 31, 1970

[21] Appl. No.: 103,267

[52] U.S. Cl. ....................179/18 R

[51] Int. Cl. ....................H04q 3/54

[58] Field of Search ....................179/18 ES, 18 GC; 340/166 R

[56] References Cited

UNITED STATES PATENTS

| | | | |
|---|---|---|---|
| 3,065,458 | 11/1962 | Lucas | 340/166 |
| 3,311,883 | 3/1967 | Schmitz | 340/166 |
| 3,553,384 | 1/1971 | Lucas | 179/18 ES |
| 3,555,196 | 1/1971 | Singer | 179/18 ES |
| 3,564,149 | 2/1971 | Funk | 179/18 ES |

*Primary Examiner*—Harold I. Pitts
*Attorney*—Craig & Antonelli

[57] ABSTRACT

A marker circuit, particularly an outgoing trunk marker, provides marking signals, and other signals for servicing a plurality of equipment. For outgoing trunk marking purposes, battery marking signals are employed to mark a designated outgoing trunk group out of up to 100 groups on a time division multiplex basis. Revertive and paystation call features, in addition to fault detection circuitry are also incorporated into the marker.

18 Claims, 7 Drawing Figures

INVENTORS
OTTO ALTENBURGER
DAVID W. STODDARD

BY Craig, Antonelli, Stewart & Hill

ATTORNEYS

OUTGOING TRUNK MARKER

The present invention is directed in general to telephone systems and more particularly to an outgoing trunk marker for an electronic switching system.

In present day telephone systems, marking equipment is employed to perform a plurality of functions and to provide appropriate control signals between control system components, external circuits and system monitoring equipment. In electronic switching systems, where multi-purpose translator equipment is employed, signals which connect a subscriber to an outgoing trunk, set up a revertive call connection, enable testing equipment, etc., require efficient processing through the use of non-complex equipment.

To provide equipment for processing such signals, the present invention is directed to an outgoing trunk marker which is not only capable of marking outgoing trunks, but which may service a plurality of equipments in the performance of different functions. In order to mark outgoing trunks, the outgoing trunk market of the present invention provides battery marking for terminating connections and is incorporated into an electronic digital switching system on a time division multiplex basis.

The outgoing trunk marker is capable of servicing up to 100 outgoing trunk groups, and employs a two-digit trunk group number which results from translation by an appropriate number and code translator. Furthermore, in the event that the trunk group to be marked is completely busy, an equipment busy indication will be delivered by the marker to a junctor via a junctor control.

The outgoing trunk marker may also be employed to provide ringing code information for revertive calls and pay station information where a subscriber has obtained an operator through a pay station. Appropriate signals are provided through the use of number and code translator equipments, respectively, for this purpose.

In addition, where fault recording equipment is employed in the case of a fault print out and where monitor and testing equipment is used, the outgoing trunk marker of the present invention has appropriate circuitry for providing error indication signals and to provide transfer to a standby marker in the event that the marker circuitry fails.

To provide the above-mentioned features, the outgoing trunk marker of the present invention consists essentially of information storage and output circuitry, control circuitry for providing the necessary timing signals within the equipment of the marker and a time-out fault accumulator where monitoring and testing is to be employed. Dialed information, which has been translated into equipment information from a number or a code translator, provides digital signals indicating the tens and units position of a desired outgoing trunk group for an outgoing call. Thus, up to 100 outgoing trunk groups may be handled; however, the number is not limitative and may be more or less than 100.

The stored digital information representing the units and tens digits is converted into decimal form and operates a series of tens andunits relays in the marker output circuitry. These relays are essentially in matrix form and when an appropriate pair of respective tens and units relays are activated, and a mark battery relay, which is connected to the matrix, is subsequently actuated, negative voltage is available for the transmission of ground pulses to the trunk group.

In the event that a desired trunk group is busy, control circuitry provides an equipment busy signal through the system to the junctor. However, if a trunk group is marked, a junctor activation signal will be generated, whereby the subscriber can be connected to the appropriate outgoing trunk.

Where a revertive call is to be established, the control circuitry together with the trunk group matrix can apply ringing codes to the appropriate revertive call trunk in essentially the same manner that an outgoing trunk group is marked.

A fault accumulator is also provided whereby, if a fault is detected during the operation of the outgoing trunk marker, an appropriate recording signal is generated and if several faults occur within a specified period of time, which is determined by a decimal counter employed within the fault accumulator, transfer signals are generated so as to select a standby outgoing trunk marker. A separate digital counter is employed for signal timing errors so as to provide a signal to initiate fault recording which is separate from the operation of the decimal counter which counts a predetermined number of specific system failures.

Finally, where pay station calls are to be handled, the control circuitry employs a specific numerical indication in the digital decoding circuitry, which is responsive to a pay station call, so as to indicate to the operator that a pay station call is being made.

With a system having the plurality of features previously described and subsequently to be explained in detail, it is an object of the present invention to provide an outgoing trunk marker which is capable of serving a plurality of outgoing trunk groups and to provide an indication to a system junctor when a trunk group to be marked is busy.

It is a further object of the present invention to provide an trunk group trunk marker which is able to provide ringing recording information from the system number translator during the establishment of a revertive call.

It is an additional object of the present invention to provide pay station information to an operator when the code translator indicates a call has originated from a pay phone, so that the trunk marker may mark appropriate CLR toll trunk groups.

It is still a further object of the present invention to provide the necessary information including trunk group number, ringing code and marking buss to fault recording control equipment in the event a fault print out is to be initiated.

It is still an additional object of the present invention to provide an outgoing trunk marker which transmits all information necessary for checking the outgoing trunk group marker in a simulated terminating call basis through an outgoing trunk marker tester.

It is also an object of the present invention to provide an outgoing trunk group marker which includes equipment for counting terminating call seizures for traffic monitoring purposes.

It is also an object of the present invention to provide an outgoing trunk group marker which employs fault detection equipment for making a transfer from the particular group trunk marker to a standby marker in the event that a predetermined number of faults occur within a specified period of time or in the event of a system voltage loss.

These and other objects, features and advantages of the present invention will become more apparent from the following detailed description thereof when taken in conjunction with the accompanying drawings which illustrate one exemplary embodiment of the present invention and wherein:

FIG. 1 is a schematic block diagram of the telephone system incorporating the features of the present invention;

FIG. 1*a* is a block diagram of the circuit elements making up the outgoing trunk marker of the present invention;

Figure 1:
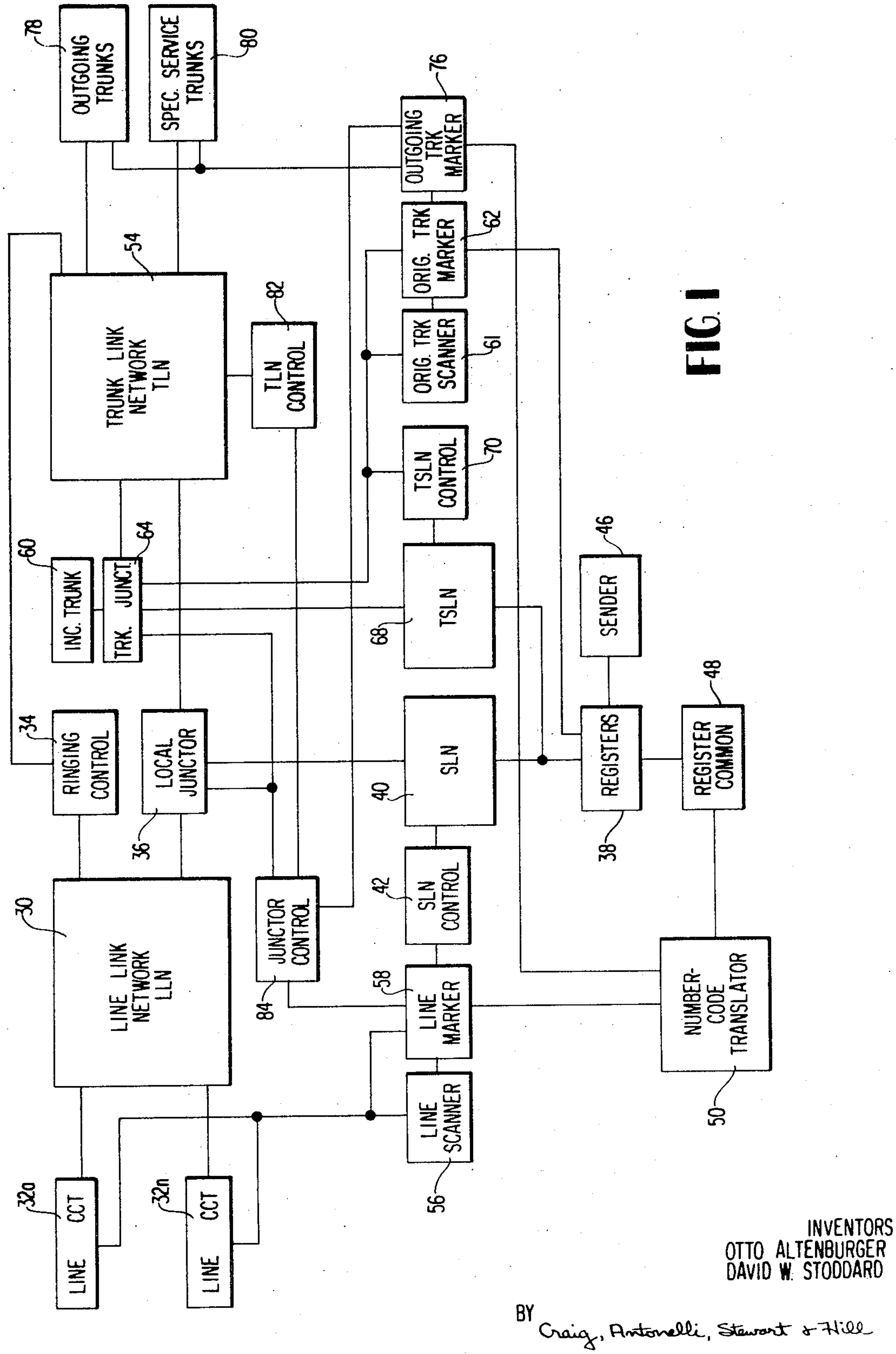

Referring now to FIG. 1, there is shown a general block diagram the telephone system of the present invention which includes a plurality of line circuits 32*a*–32 which are connected to a line link network 30. The line link network 30 functions as a concentrator for originating line calls and as a fan out for terminating calls. On the side of the line link network opposite the line circuits, local junctors 36 for originating traffic and ringing control circuitry 34 for terminating traffic are connected. The number of local junctors and ringing controls provided will depend upon the traffic requirements of the system. The local junctors 36 serve as the focal points for all originating types of traffic and enable connections between the line circuits 32a-32n and the local registers 38 by way of service link network 40 and also provide transmission battery for calling and called parties on intra-office calls. Local junctors 36 are controlled by the calling party and when trunk or station busy conditions are encountered, junctor 36 provides busy tone to the calling party. The junctor may, for example, take the form of the junctor and junctor control circuit disclosed in the copending application of Otto Altenburger and assigned to the assignee of the present application, Ser. No. 100,571 filed Dec. 22, 1970.

Service link network 40 is controlled by service link network control circuit 42 for connecting the appropriate calling line circuit 30a-30n via one of the local junctors 36 to one of a plurality of registers 38. The local registers 38, when connected to the local junctors 36, provide dial tone and are responsive to the instructions of the subscriber. The local registers consist of a dial pulse acceptor register storage and register output and are connectable to a sender 46 for providing outpulsing. The registers and senders are controlled by a register common control 48. The local registers 38 are connected to the register common control 48 on a time division multiplex basis, wherein information is passed from one equipment to another on a common bus. The register common control 48 is also connected to a number-code translator 50 on a time division multiplex basis; the latter being connected to scanner 56 through line marker 58 which may take the form of the line scanner and marker circuit disclosed in the copending application Ser. No. 101,091, filed Dec. 23, 1970 of Otto Altenburger and Gunther Neumeier and assigned to the same assignee as the present application, so as to access the individual line circuits 32*a*–32*n*.

The ringing control circuit 34 disclosed in the copending application Ser. No. 100,647, filed Dec. 22, 1970 of Otto Altenburger and assigned to the assignee of the present application, connects ringing generators to the called stations, detects off-hook conditions, (ring-trip) of the called station, and provides ring-back tone for the calling station. Each line circuit can be connected to any one of a plurality of ringing controls which are accessed from a trunk link network 54.

The line scanner circuit 56, which may take the form of the above-mentioned line scanner and marker circuit of copending Ser. No. 101,091, filed Dec. 23, 1970, is used for both originating and terminating types of calls continuously checks the line circuits 32*a*–32*n* for an off-hook condition. For an originating call, the line scanner stops when an off-hook condition is detected and transmits the information from its counter circuits to a line marker circuit, marking the particular line circuit and enabling the service link network control 42. For a terminating call, the line scanner is controlled by the number translator 50, the line scanner receiving an equipment number from the number translator to mark the appropriate line circuit with the particular equipment number location. The line marker also transmits classes of service, ringing codes, busy or idle status and the types of ringing required.

In operation, when a telephone goes off-hook, line scanner 56 detects the off-hook condition and marks the line circuit via the line marker 58 to the line link network 30. Simultaneously, the line marker 58 signals the service link network control 42 to initiate path finding for connecting the marked line circuit to one of the local registers 38. The service link network control 42 detects and locates a path by locating the existence of a free path from a local register to the line circuit and identifying and marking one of the local registers and its corresponding stage matrix module within the service link network 40. A local junctor is then identified and a connection between the local junctor 36 to the line link 30 from the service link network 40 is provided. When a path has been completed, the selected matrix relay coils within the line link network and the service link network are energized and the metallic connections through the tip and ring leads are checked. If the connection is complete, the sleeve coil connections are completed and the connected local junctor 36 is siezed.

Service link network control 42 and line scanner 56 are then released and the local register 38 is connected to the subscriber to receive dial information therefrom. Once the subscriber information has been dialed and received in a local register 38, the call is routed either internally to another local subscriber or externally to another exchange.

Incoming calls from other exchanges are applied to one of a plurality of incoming trunks 60. An incoming trunk scanning circuit 61 scans the incoming trunks 60 for a siezed incoming trunk circuit. When a siezed incoming trunk circuit is located, scanning circuit 61 stops and transmits the trunk equipment number to a marker circuit 62, identifying the particular incoming trunk. The identified incoming trunk is also connected to a trunk junctor 64. The junctor 64 functions as a focal point for all incoming types of traffic and enables the incoming trunk to be connected to anyone of a plurality of registers by way of the trunk service link network 68. The trunk junctors 64 also provide the incoming and called party with transmission battery and, upon encountering either trunk or station busy conditions, return a busy tone to the incoming call.

The trunk service link network control circuit 70 locates a path between the trunk junctors 64 and the registers 38. The trunk scanner marker circuit 61 signals the trunk service link network control 70 in order to access one of the registers within the local register circuit 38, which has been determined by the trunk junctor 64.

A multifrequency detector is also connected to the trunk registers and is controlled by the register common control 48 on a time division multiplex basis.

For outgoing calls, outgoing trunks 78 and special service trunks 80 are connected to the trunk link network 54. The outgoing trunk marker 76 which will be described in more detail below is connected to the groups of outgoing and special service trunks, to the junctor control 84 and to the number-code translator 50 for receiving identification digits therefrom.

For identifying an incoming trunk call, the trunk marker and scanner operates substantially the same as the line marker and scanner previously discussed. The scanning circuit 61 detects a free path between one of the registers and the siezed trunk junctor 64 and a register is identified and marked. With a free path through the trunk service link network 68 located, the mark relay coils through the matrix modules within the network are energized and the appropriate register is connected to the trunk junctor 64. Metallic connections through tip and ring leads are checked, the sleeve connections are completed and the trunk service link network 68 control 70 and the incoming trunk scanner 61 and its associated marker 62 are released. The call is then routed internally to a local subscriber or externally to another exchange by way of the outgoing trunks 78.

The trunk link network 54 provides for a termination of local traffic to the local subscribers of incoming calls from other exchanges to local subscribers and connects incoming calls from other exchanges to other external exchanges. One of the stages within the trunk link network 54 is connected to the local junctors 36 and to the trunk junctors 64. The trunk link network 54 is also connected by way of ringing control circuit 34 to the line link network 30 and to outgoing trunks 78.

Trunk link network control 82 and junctor control 84 provides path finding through trunk link network 54. Control circuits 82 and 84 cooperate in completing the terminating portion of a call, whether it is internally terminated or an outgoing call to a distant office. The number translator 50 and line marker 58 are employed to complete calls to a local line while the translator 50 and the outgoing trunk marker 76 complete calls to trunks.

In order to determine the path through the trunk link network, a two-step scan is employed. Local junctor 36 or trunk junctor 64 are marked ( depending upon whether the call is incoming or locally generated ). Information within the register circuit 38 is transmitted by way of register common control 48 to the translator 50, which contains both number and code translators. If the call terminates at a local subscriber, the number translator portion will be employed, while if the call is to be forwarded to a distant exchange, the code translator portion of translator 50 will be employed. For a local call, the number translator portion of the translator 50 marks a line circuit by way of the line scanner and marker circuits 56 and 58. For an outgoing call, the code translator marks the particular outgoing trunk group 78 by way of the outgoing trunk marker circuit 76 of the present invention, as will be explained in detail below.

The first scan of the trunk link network control 82 detects a free path through the trunk link network 54 through either the marked outgoing trunk 78, or via the ringing control 34 and the line link network 30 to a line circuit **32*a*–32*n***. The next scan completes connection back to the modules of the network and provides power therethrough and through the line link network to energize a mark relay coil. Once a metallic path check is made via the tip and ring leads, the sleeve connections are picked up to complete the connection through the trunk link network.

The ringing control circuit 34 now rings the called party. The connections through the line link network 30 and the trunk link network 54 and the local or trunk junctors 36 or 64 are maintained during the call under the control of the calling party. When the calling party hangs up, all connections are broken. In the event that the calling party remains off-hook after the called party hangs up, provisions are included in the junctor circuits so that the connections are broken after a preset period of time.

As was discussed above, in the event of an outgoing call, the translator 50 marks the particular outgoing trunk group 78 via the outgoing trunk marker circuit 76 of the present invention. The outgoing trunk marker circuit 76 is provided on a system basis and serves up to 100 groups of outgoing trunks. The trunk marker receives binary coded decimal ( BCD ) information on a time division multiplex basis from the number and code translator 50 for terminating calls. The information received is decoded into trunk group numbers and into ringing codes, equipment busy, or pay station indications.

The outgoing trunk marker employs the trunk group number to connect marked battery to the indicated group of outgoing trunks. The ringing code is transmitted as required through a group of revertive call trunks, while pay station indication signals are sent to a group of CLR toll trunks, the revertive call trunks and toll trunks being provided at a special service trunk 80. In the event that no trunk is available, the outgoing trunk marker 76 delivers a busy signal indication to junctor control 84.

Furthermore, if a fault is detected during the operation of the outgoing trunk marker, fault recording is initiated and, if several minor faults occur within a specified period of time or if a major fault occurs, transfer to a stand-by outgoing trunk marker is initiated. For specific details of the outgoing trunk marker of the present invention, attention is directed to FIGS. 1*a* through 7, for a schematic representation of the elements employed therein.

Figures 1A, 2:
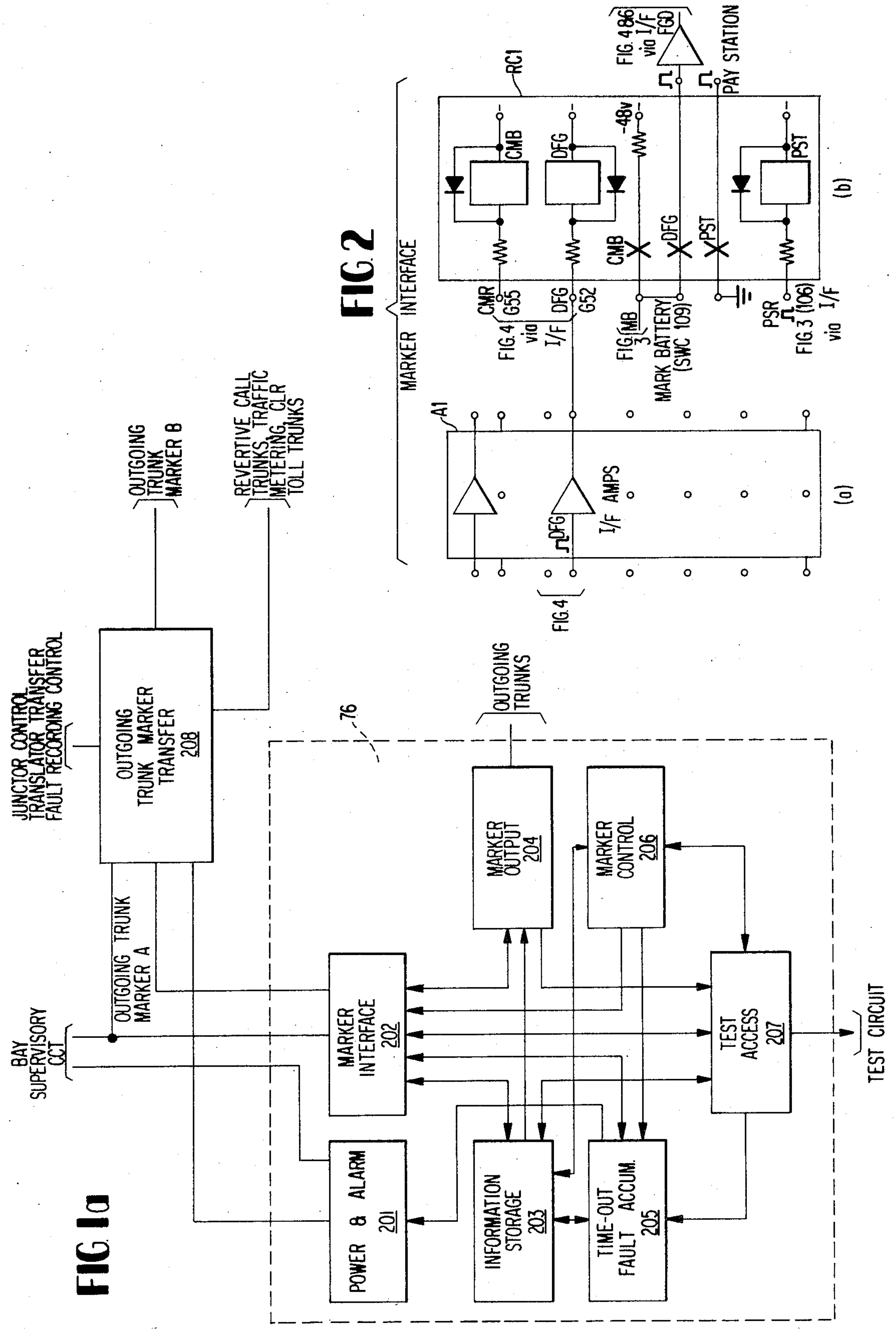
FIG. 2 illustrates the marker interface shown in block diagram form in FIG. 1*a;*

FIG. 1a shows, in block diagram form, the elements employed in the outgoing trunk of the marker circuit. The outgoing trunk marker circuit 76 is connected to the junctor control 84, the trunk circuits 78 and 80 and the translator circuits 50 as shown in FIG. 1, through appropriate interface circuitry designated as outgoing marker transfer 208. The transfer circuit 208 also provides appropriate interfacing between the trunk marker and revertive call trunks, traffic metering, CLR toll trunks, an auxiliary trunk marker B and false recording control circuitry.

As is shown in FIG. 1a, the outgoing trunk marker circuit 76 includes a power and alarm stage 201 which provides power to the remainder of the marker. The power and alarm circuit 201 includes a D. C. -D. C. converter for proper power distribution to the remainder of the marker circuitry and also includes a monitor and alarm circuit. The monitor and alarm circuit monitors a clock pulse signal from the time-out fault accumulator 205 and if the clock pulse monitor signal ( CPM ) delivered by time-out pulse accumulator 205 is interrupted or a voltage loss occurs within the system, an alarm relay within the monitor and alarm circuit will release, generating a transfer signal and an emergency alarm signal. The emergency alarm signal is sent to a bay supervisory circuit while the transfer signal is sent through the outgoing mark transfer 208 to initiate transfer to a standby marker B.

The outgoing trunk marker 76 also includes its own marker interface circuit 202 for providing the appropriate polarity conversion between outgoing and incoming signals and vice versa. An information storage circuit 203 is employed to provide storage and conversion of the various binary and decimal signals employed for marking outgoing runk groups. The trunk group number information stored in the information storage circuit 203 is transferred to the marker output circuit 204 for marking of the designated outgoing trunk group. The control of the outgoing trunk marker is provided by marker control circuit 206 while error conditions are detected by time-out and fault accumulator circuit 205. Finally, a test access circuit 207 is employed to provide terminal connections between the outgoing trunk marker 76 and test circuitry which may be employed for monitoring various conditions of the trunk marker.

Specific details of the elements of the outgoing trunk marker will be further illustrated in FIGS. 2 through 7.

As is shown in FIG. 2(*a*), the interface consists essentially of inverting and level correcting amplifiers provided between the terminals of a bank A1 of interface connections. These interface amplifiers ensure that the characteristics of the signals transmitted between various equipments are of the proper polarity and shape. Also employed in the marker interface is a relay circuit RC1 shown in FIG. 2(*b*) which employs relays CMB, DFG and PST. These relays provide necessary mark battery signals, disconnect false ground signals and pay station signals as will be explained in connection with FIGS. 3 and 4.

Figure 3:
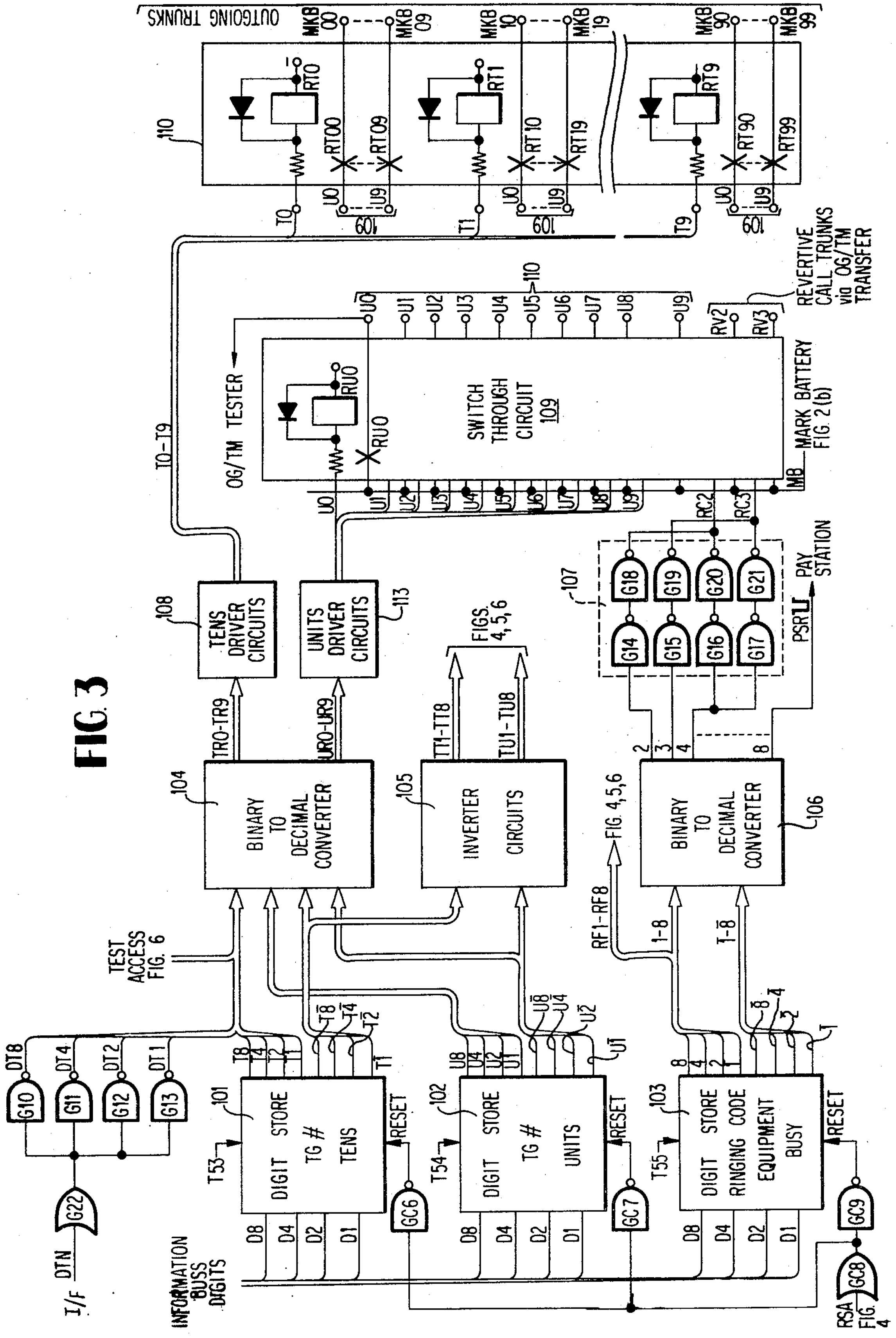
FIG. 3 illustrates the information storage, and marker output connections of the present invention shown in block diagram form in FIG. 1*a;*

FIG. 3 schematically illustrates the information storage and marker output circuits 203 and 204 shown in block diagram form in FIG. 1a. When an outgoing call is to be made, the digits received in the translator, which are converted to the appropriate equipment number, are sent to the information storage circuit shown in FIG. 3 through the appropriate interface circuitry as information buss binary digits D1-D8. These digital signals represent the trunk group number, equipment busy indication, ringing code and pay station indication signals provided by the code translator. For conversion into trunk group numbers, the digits are stored in storage circuits 101 and 102, respectively representing the tens and units digits of trunk group numbers since up to 100 trunk groups are employed. The digits are also stored in digits stored circuit 103 for providing ringing code and equipment busy indication signals. The storage circuits 101 through 103 may be standard binary storage registers well known to those skilled in the art. Inputs T 53, T54, and T55 represent time division multiplexed pulses received from the time slot counter of the system, which controls the multiplex operations thereof. When an enabling pulse T 53 is received by digit storage circuit 101, the digits on the information buss from the translator will be stored in digit store circuit 101 representing the tens digit store. Similarly, upon reception of the subsequent enabling signals T 54, and T 55, the storage units 102 and 103 will store the information buss digits. The digits stored are represented in binary form at the outputs of the digits store circuits 101–103 as signals T1–T8 . . . U1–U8 . . . 1–8, respectively. The outputs of the digits storage circuits 101–103 are converted into decimal form by binary to decimal converters 104 and 106. The tens and units digits representing respective trunk group numbers are illustrated as signals TRO–TR9 and URO–UR9 in FIG. 3.

Inverter circuitry 105 is employed to invert the NOT outputs of the digit store circuits 101 and 102 into appropriate form as digits TT1–TT8 and TU1–TU8. These signals together with the output of the digit store circuit 103, represented by signals RF1–RF8, are transmitted to circuits 4, 5 and 6 for processing, as will be subsequently described. A tens digit disabling signal DTN, where employed in place of the normal tens digit signal, is transmitted via the interface circuitry from the outgoing marker transfer interface circuit through gate G22 and gates G10–G13 into the binary to decimal converter 104 in parallel with the outputs from digit storage circuit 101. Additional lines may be connected in parallel from the test access circuit connection shown in FIG. 6 and illustrated as an input to the BCD converter 104. In order to convert the trunk group number signal delivered from the translator into appropriate relay energizing signals for marking an outgoing trunk group, the converted decimal digits TRO–TR9 and URO–UR9 are amplified in driver circuits 108 and 113 and delivered to relay switching circuits 109 and 110. Also connected to the switch circuit 109 is the output of binary to decimal converter 106 through buffer circuit 107 consisting of gate circuits G14–G21 for providing the ringing codes RC2 and RC3.

Switch circuit 109 includes a plurality of relays and associated contacts as illustrated, for example, by relay RUO and its corresponding contact RUO. Switching circuit 110 includes a plurality of relays as exemplified by relay RTO and associated contacts RTOO–RT99. The operation of these switching circuits in energizing an appropriate outgoing trunk group may be illustrated as follows.

Assuming that translator delivers signals indicating that trunk group O9 corresponds to the digits translated thereby, digit store circuit 101 will provide a zero on each of the outputs T8–T1 while digit store 102 will provide outputs at U8 and U1. After the signals are converted into decimal form by a BCD converter 104, the units driver circuit 113 will deliver a signal in the conductor U9 corresponding to the digit 9. The tens driver circuit 108 will provide a signal in the conductor TO corresponding to a decimal zero. With a signal at the input of switch circuit 109 on conductor U9, the relay RU9 will be energized, closing its corresponding contact RU9. Similarly, conductor TO will cause relay RTO within switching circuit 110 to be energized thereby closing each of the contacts RTOO through RTO9. If relay CMB, shown in FIG. 2, has been energized, as will be discussed subsequently in connection with FIG. 4, its contact CMB will close, enabling a minus 48 V potential to be delivered as a mark battery signal to each of the contacts RUO–RU9 within switch through circuit 109. Since relay RU9 has been energized, a mark battery will be delivered to closed contacts RU9 to the output U9.

Each of the outputs UO–U9 of the switch through circuit 109 is connected to each of the inputs UO–U9 of switch circuit 110. With relays RU9 and RTO energized, the mark battery potential will be delivered to the output MKBO9 of switch circuit 110. This mark potential is then delivered to outgoing trunk group 9 to mark that group.

Where a revertive call trunk is to be marked, the translator will have delivered an enabling signal at input T 55 of the digit store circuit 103, whereby ringing code signals RC2 and RC3 will energize their respective relays in the same manner that the remaining relays in the switchthrough circuit 109 are energized. The outputs RV2 and RV3 enable an appropriate mark battery connection to the revertive call trunks through the interface of the outgoing trunk marker transfer circuit.

Where a pay station indication is to be sent to a group of CLR toll trunks, a decimal 8 output from BCD converter 106 provides an energizing level to be delivered to the relay circuit R C1 shown in FIG. 2b so as to energize relay PST, thereby closing contacts PST, so that the necessary indication will be sent to the CLR toll trunks.

For resetting the storage circuits 101–103, gate circuits GC6–GC9 are provided, so that upon reception of a reset signal RSA from the control circuit of FIG. 4 as will be subsequently described, the tens, units and ringing code equipment busy storage circuits will be reset for the reception of a new set of signals from the translator. Finally, the switch through circuit 109 is monitored at the outgoing marker tester through the zero units digit U9.

Figure 4:
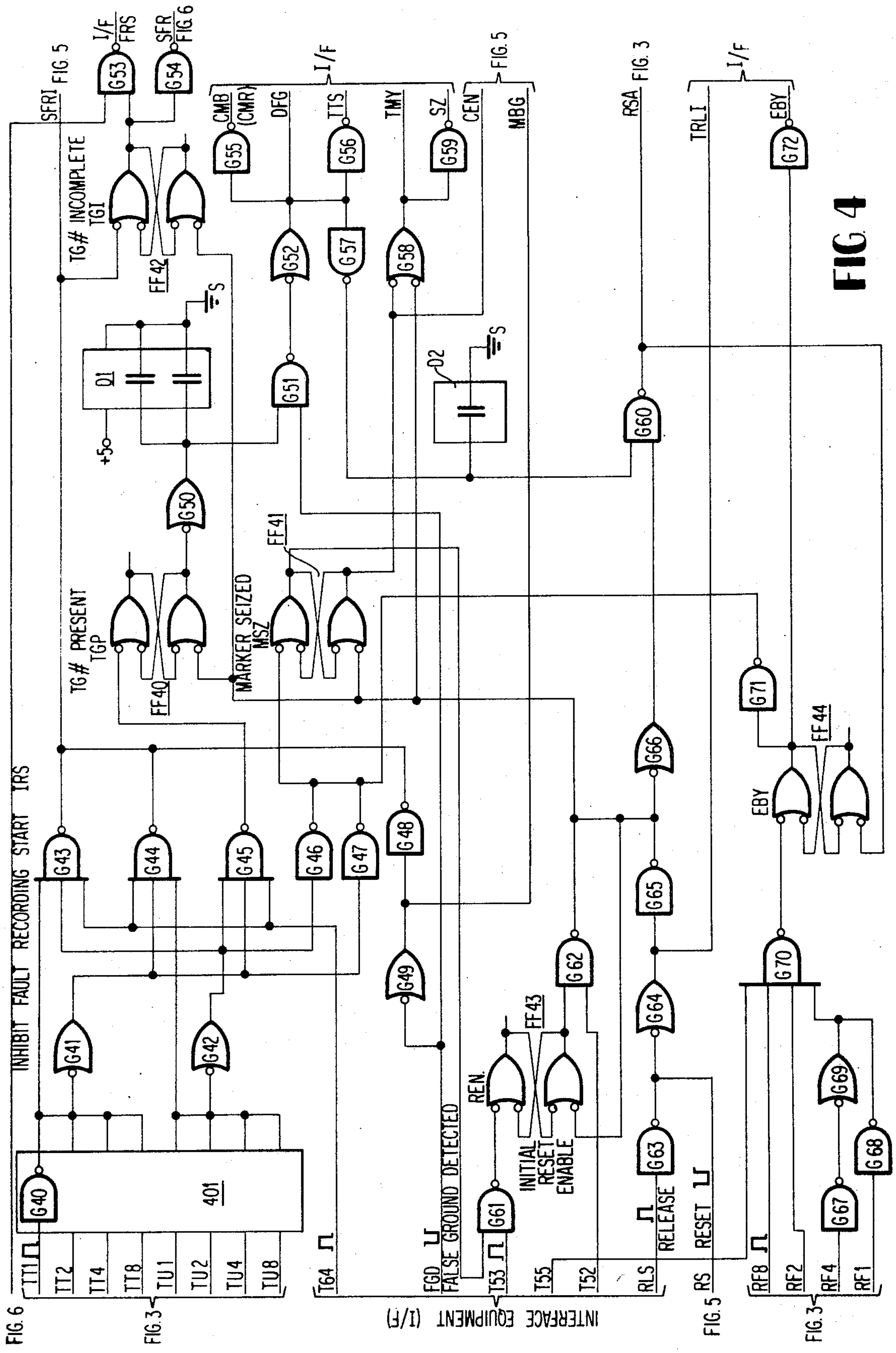
FIG. 4 shows the marker control circuitry of the trunk marker of the present invention.

The control circuitry for the outgoing trunk marker is shown in FIG. 4. When the marker is in an unsiezed condition, the translator delivers a signal T 52 through the interface equipment to gate circuit G 62. The output of gate circuit G62 is inverted by gate circuit G 66 and delivered to gate circuit G 60 so as to provide the reset signal RSA which is delivered to gate circuit GC8 in FIG. 3 to reset each of the digits storage circuits 101–103. When an outgoing trunk circuit is to be siezed, the signals representing a tens trunk group number and a units trunk group number on lines TT1–TT8 and TU1–TU8 from the inverter circuit 105 in FIG. 3 are received at the input of gating ladder 401 which contains a plurality of inverter gates, one for each of the input lines, such as gate G40, as shown within block 401. Gate circuits G41 and/or G42 will then deliver an enabling set signal to the marker siezed flip-flop MSZ through gates G 46 and G47. Upon the appearance of the time slot signal T64, gate G45 will deliver a set signal to the trunk group number present flip-flop TGP.

Figure 5:
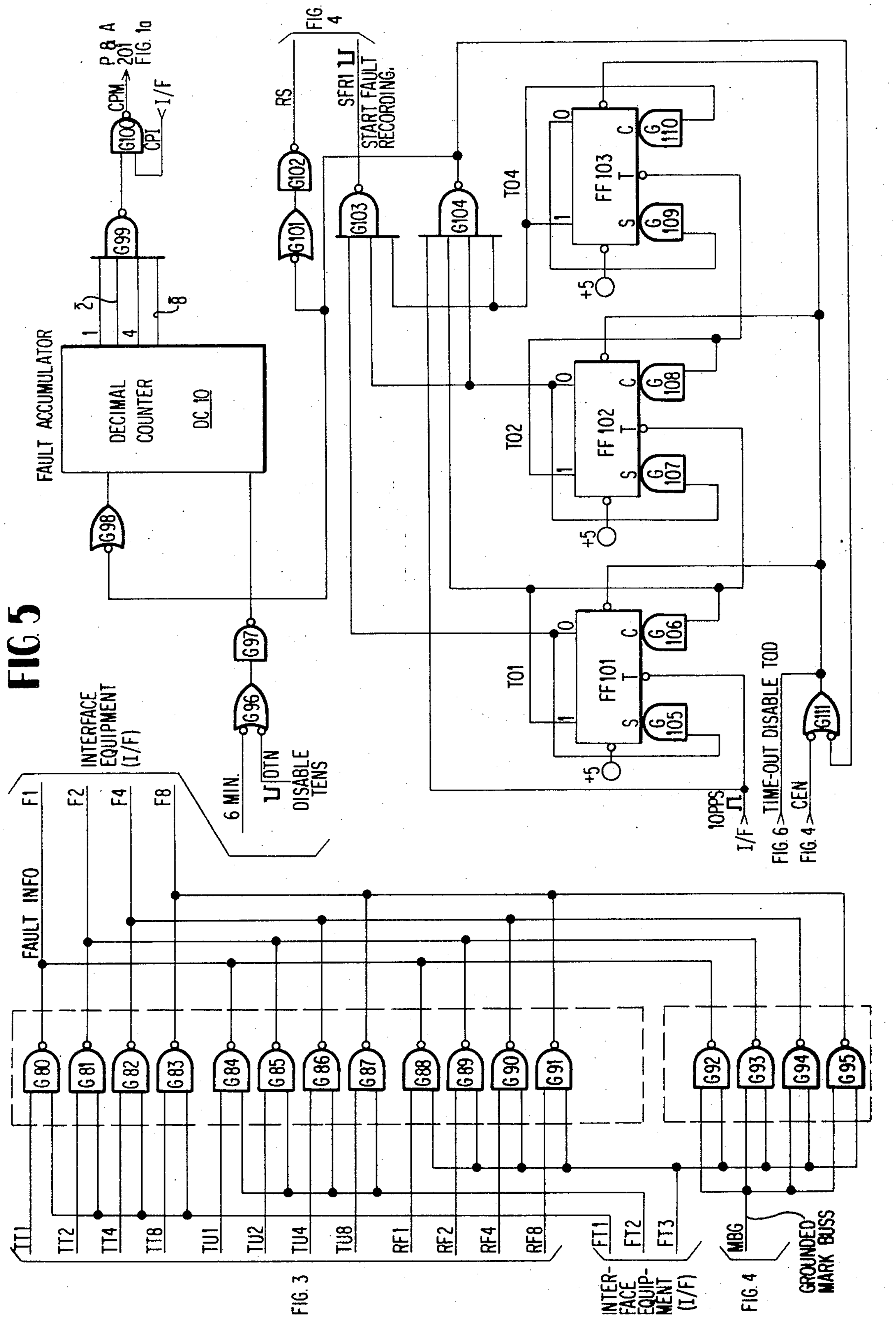
FIG. 5 shows the time-out and fault accumulator circuitry employed in the present invention.

The MSZ storage flip-flop provides a counter enable signal CEN and sends it to gate G111 shown in FIG. 5. Through gates G58 and G59, the counter enable signal CEN is converted into marker busy and marker siezed signals TMY and SZ, respectively. The marker busy signal is ultimately interfaced to the translator, while the sieze signal SZ is delivered to traffic metering circuit through appropriate interface elements.

The set output of the marker siezed flip-flop MSZ is combined with time slot signal T53 from the translator in the circuit G 61, so as to set an initial reset enable storage flip-flop REN which, in turn, prevents time slot signal T52 from generating reset signals while the marker is siezed, gate circuit G62 being disabled from the reset side of flip-flop FF43.

The trunk group present flip-flop TGP has its reset output inverted by gate circuit G50 and delayed by delay circuit D1. D1 enables the relays of the relay matrix, circuits 109 and 110 of FIG. 3, to check the desired marking path MKB for false grounds. If a false ground is present, it is detected by an I/F amplifier in FIG. 2a via the MB lead from FIG. 3, the DFG contact in RC1 of FIG. 2b and the FGD lead. The I/F amplifier sends an FGD signal to FIG. 4 to inhibit gate circuits G51 and G52 from generating the disconnect false ground relay signal DFG, gate circuit G55 from generating the connect mark battery signal CMB and the gate circuit G56 from generating the start terminating trunk signal TTS. With no false ground detected at the end of the time delay provided by D1, the DFG relay is released opening the DFG contact. Simultaneously, the CMB signal is converted, by an I/F amp in FIG. 2, to a connect mark relay signal CMR to energize the CMB relay. Closing of the CMB contact connects the mark battery to the desired marking path MKB. Also, the TTS signal is generated for transmission to the junctor control and test circuitry.

The above-mentioned signal FGD shown in FIG. 2, is inverted by gate G49, as shown in FIG. 4, and through each of the gate circuits G92–G95 shown in FIG. 5. The outputs of these latter gate circuits are connected to appropriate interface equipment and delivered to fault recording control equipment. (not shown)

The output of gate G49 is also connected to gate G48 so as to set the trunk group number incomplete flip-flop FF42. When flip-flop FF42 is set, start fault recording signals FRS and SFR are generated through gates G53 and G54, respectively. These signals are transmitted through the appropriate interface equipment for delivery to the junctor control and fault recording control equipment.

If a tens group number or the unit group number is not present during time slot T 64, or if a start fault recording signal SFRI is received from the output of gate circuit 103, sown in FIG. 5, TGI storage circuit FF42 is set, producing the results mentioned above. An fault recording start signal IRS from the outgoing trunk marker tester ( not shown ) inhibits the generation of the FRS signal via the terminal connection in FIG. 6, as gate circuit G53.

If the output of digit storage circuit 103, shown in FIG. 3, provides a binary 14 on leads RF1-RF8, coincident with time slot signal T55, gate circuit G 70 will be energized and will set equipment busy flip-flop FF 44. Flip-flop FF 44 via gate G 71, sets the marker siezed flip-flop FF 41. Also, the set output of the equipment busy flip-flop FF 44 is passed through gate circuit G 72 to the junctor control via appropriate interface equipment indicating that no trunk path is available.

When fault recording has been released, the appropriate interface equipment provides a release signal RLS, so as to provide a translator release signal TRLI and to reset each of the storage circuits of FIG. 4 by way of gate circuit G 65. Through gate circuits G 51 and G 52, gate circuit G55 removes the CMB signal to cause the release of mark battery before the storage reset signal RSA is delivered to GC 8 so as to reset each of the storage circuits 101–103, in FIG. 3.

The fault accumulator time-out equipment is shown schematically in FIG. 5. When fault recording signals FI1-FI3 are received from fault recording control equipment, the coincidence of signals TT1–TT8, TU1, TU8, RF1–RF8 from the storage circuits in FIG. 3 will enable the appropriate gate circuits G 80–G91 to provide fault information on one of the outputs F1–F8. The marked buss grounded MGB from FIG. 4 is also ANDED with false recording time slot FT3 so as to generate a fault information signal.

The counter enable signal CEN provided by the marker siezed flip-flop FF41 of FIG. 4, allows the time-out counter, consisting of flip-flops FF-101–FF-104, to begin counting with a ten PPS clock pulse delivered from the translator. The position of the clock pulse at the time CEN appears can extend the normal time out cycle by a 100 milliseconds. If marker release does not occur within 300 to 400 milliseconds after the generation of the CEN signal, the gate G103 will be energized in view of the state of the flip-flops FF101–FF104, thereby providing a start fault recording signal SFRI, which is sent to the flip-flop FF42, shown in FIG. 4.

If the marker is not released by the fault recording control within 150 milliseconds after the generation of the SFRI signal a forced release signal RS is generated and sent to FIG. 4 for a duration of 50 milliseconds. Reset signal RS, as was previously discussed, clears each of the storage flip-flops of the control circuit shown in FIG. 4.

The resetting of the time-out counter is inhibited until the release sequence initiated by the signal RS has had a chance to occur. The time out counter can also be reset by time-out disable signal TOD received from the outgoing trunk marker tester via the terminal connections shown in FIG. 6.

The fault accumulator is triggered upon removal of the RS signal to prevent transfer while the marker is still siezed. When the count by the fault accumulator reaches 5, gate circuit G 99 is enabled, thereby inhibiting gate circuit G100 and preventing a clock pulse monitor signal CPN from being sent to the power and alarm circuit 201 shown in FIG. 1*a*, so as to result in the generation of a transfer signal, as was previously discussed.

The fault accumulator which employs decimal counter DC10 is reset every 6 minutes by a 6 minute signal provided by the bay supervisory circuit or whenever the DTN signal is received so as to disable the mark relays.

Figure 6:
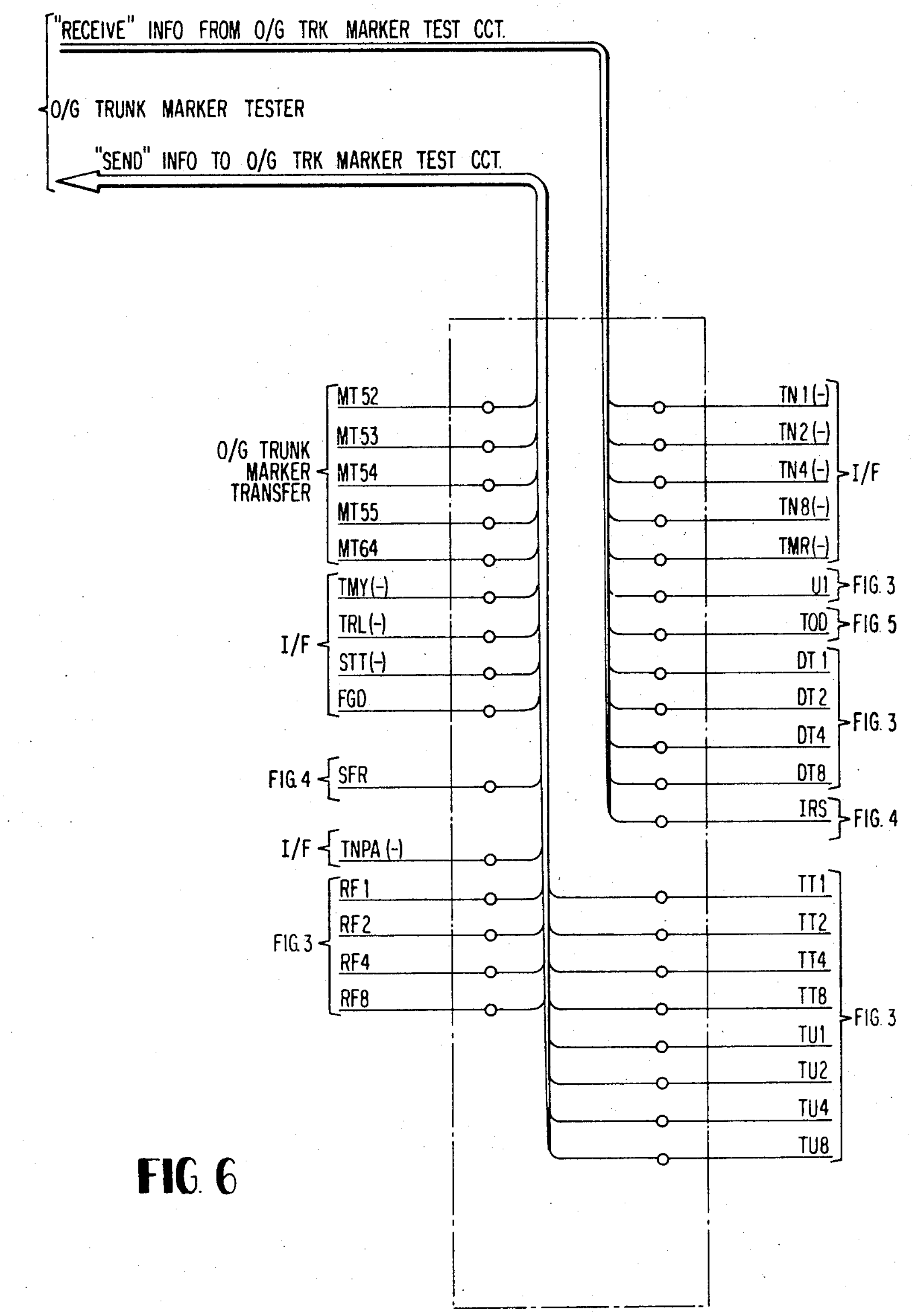
FIG. 6 shows the test access terminal connections employed with the marker of the present invention.

The test access circuit shown in FIG. 6 illustrates the terminal connections between various portions of the storage and control circuitry of the outgoing trunk marker and an outgoing trunk marker tester which is employed for monitoring a trunk marker circuit.

We claim:

1. In an electronic telephone switching system having a translator for converting dialed information to and from equipment location information, a junctor, connector link network equipment, a plurality of connector circuits and a mark battery for providing connector circuit mark signals to said connector circuits, a marker for marking said connector circuits in response to signals delivered from said translator, said marker comprising:

first means for storing information signals delivered from said translator representing an equipment number location of connector circuit to be marked;

second means responsive to the storage of equipment number location signals delivered by said translator to said first means for enabling the delivery of a mark battery signal to one of said connector circuits;

third means responsive to said first and second means for providing a unique path between said mark battery and said connector circuit location; and fourth means responsive to the existence of an equipment failure within said system during an attempt to mark connector circuit for providing a fault indication signal, whereby the operation of said marker may be monitored and/or recorded upon the existence of predetermined system error conditions.

2. A marker in accordance with claim 1, wherein said plurality of connector circuits includes a plurality of diverse connector circuits, said translator identifying each connector circuit by specific digital information representing the equipment and location of each connector circuit and wherein said first means includes a plurality of digital storage circuits for storing connector circuit location signals delivered by said translator and further including corresponding converter circuitry connected to said storage circuits for converting said digital connector circuit location signals into decimal equipment location signals.

3. A marker in accordance with claim 2, wherein each connector circuit is identified by a decimal numerical location corresponding to at least one decimal digit and wherein there exists a separate storage circuit for each said at least one numerical digits position and an additional storage circuit for storing special service connector circuit identification signals, and wherein said special service connector circuits comprise circuits including revertive call trunks and pay station CLR toll trunks and wherein said additional storage circuit is provided with special service converter circuitry the digits representing ringing code and pay station indication signals delivered from said translator into decimally coded ringing code and pay station indication signals, whereby the appropriate trunk from among said plurality of trunks may be marked.

4. A marker in accordance with claim 2, wherein said third means comprises a mark battery relay connected to said mark battery and responsive to the output of said second means and a matrix of relays, corresponding to the numerical locations of said connector circuits and responsive to the outputs of said converter circuitry for delivering a mark signal to the connector circuit to be marked as identified by said translator.

5. A marker in accordance with claim 4, wherein said matrix comprises a first switch through circuit made of a first bank of relays to which the contacts of said mark battery relay are connected, said first switch through circuit corresponding to one of the numerical digits identifying a connector circuit and a second switch through circuit made of a second bank of relays, the number of which corresponds to another numerical digit identifying a connector circuit, the number of contacts of each relay in said second bank of relays corresponding to the number of relays in said first bank representing said one numerical digit and wherein one of the relays in each of said first and second banks of relays are connected in series upon the delivery of a connector circuit number location signal from said connector circuit converter circuitry to said relay banks and a mark battery signal to said first bank of relays so as to mark an identified connector circuit.

6. A marker in accordance with claim 4, wherein said second means comprises a first control circuit responsive to the delivery of a connector circuit number signal from said storage circuits for generating a marker siezed signal, thereby informing said translator that said marker has been siezed and for preventing said marker from storing other connector circuit marking identification signals until said marker has been released.

7. A marker in accordance with claim 6, wherein said first control circuit includes a first flip-flop and a first flip-flop enabling circuit connected thereto for storing a signal representing a marker siezed condition, said first flip-flop being set in response to the delivery of digital signals from the connector circuit digit storage circuits.

8. A marker in accordance with claim 7, wherein said marker is an outgoing trunk group marker and said connector circuits include outgoing trunk groups, said second means further includes a second control circuit responsive to the delivery of a trunk group number signal from said storage circuits and a first timing signal from said translator for providing a mark battery relay energizing signal to be delivered to said mark battery relay, whereby said battery relay contacts are closed to initiate marking of a trunk group.

9. An outgoing trunk marker in accordance with claim 8, and wherein said second control circuit includes a series connected arrangement of a flip-flop, a second flip-flop enabling gate circuit connected thereto, and a first delay circuit connected to said second flip-flop for providing said mark battery relay energizing signal to said mark battery relay a predetermined period of time after the coincidence of said first timing signal and trunk group number signal.

10. A marker in accordance with claim 6, wherein said second means further includes a third control circuit responsive to the output of said first control circuit and a second timing signal from said translator for normally resetting said second means upon the delivery of a third timing signal but for preventing said second means from being reset while said marker is siezed.

11. An outgoing trunk marker in accordance with claim 8, wherein said second means further includes an inhibit control circuit responsive to the absence of a trunk group number signal during the delivery of said first timing signal for providing and storing an incomplete trunk group number signal for delivering to said fourth means a fault indication signal.

12. An outgoing trunk marker in accordance with claim 11, wherein said second means further includes a fourth control circuit responsive to the delivery of a predetermined digital signal from said storage circuit representing a revertive call or toll trunk call for providing and storing an equipment busy indication signal and for setting said first flip-flop so as to provide a marker siezed signal indication even though no outgoing trunk group digital signals have been received by said first control circuit.

13. A marker in accordance with claim 10, further including a first counter circuit responsive to a system clock signal and the output of said first control circuit for controlling the duration of operation of said second means for each call requiring the marking of a connector circuit.

14. A marker in accordance with claim 13, wherein said first counter circuit includes a first counter output gating circuit responsive to a first predetermined state of said counter for resetting said second means and releasing said marker and wherein said fourth means includes a second counter output gating circuit responsive to a second predetermined state of said counter for generating a timing fault indication signal whereby said fourth means will provide a fault indication signal if the marker is not released a predetermined time after said first control means provides a marker siezed indication signal.

15. A marker in accordance with claim 14, wherein said fourth means further includes a second counter circuit responsive to said first counter output gating circuit for counting the number of reset circuit produced by said first counter output gating signals and for initiating transfer of the connection of said translator to said marker in the event that said second counter counts a predetermined number of releases of said marker by said first counter circuit within a specified period of time.

16. A marker in accordance with claim 14, further including a second delay circuit connected to the output of said second control circuit for resetting each storage circuit a predetermined period of time after the generation of an output from said second control circuit.

17. A marker in accordance with claim 16, wherein said second means further includes a fifth control circuit connected to the output of said second control circuit for detecting the generation of false ground signals from the marker battery circuit, so as to inhibit the energization of said mark battery relay, whereby erroneous connector circuit marking is prevented.

18. A marker in accordance with claim 17, wherein said fifth control means includes a false ground relay connected to said mark battery relay circuit and a false ground gate circuit connected thereto and to said second control circuit to prevent the passage of the output of said second control circuit to said mark battery relay circuit.

* * * * *

UNITED STATES PATENT AND TRADEMARK OFFICE

CERTIFICATE OF CORRECTION

PATENT NO. : 3,732,377

DATED : May 8, 1973

INVENTOR(S) : Otto Altenburger, et al.

It is certified that error appears in the above-identified patent and that said Letters Patent are hereby corrected as shown below:

| | |
|---|---|
| Col.1, line 21 | "market" should read ---marker---. |
| Col. 2, line 42 | After "an" insert ---outgoing---. |
| line 42 | Delete "trunk" (second occurrence). |
| Col. 11, line 12 | Before "fault" insert ---inhibit--- |
| line 37 | "FI1-FI3" should read ---FT1-FT3---. |

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*